US009009027B2

(12) United States Patent
Lehman et al.

(10) Patent No.: US 9,009,027 B2
(45) Date of Patent: Apr. 14, 2015

(54) COMPUTER-IMPLEMENTED SYSTEMS AND METHODS FOR MOOD STATE DETERMINATION

(75) Inventors: Thomas Lehman, Holly Springs, NC (US); Jody Porowski, Raleigh, NC (US); Bruce Monroe Mills, Cary, NC (US); Michael T. Brooks, Raleigh, NC (US); Heather Michelle Goodykoontz, Raleigh, NC (US)

(73) Assignee: SAS Institute Inc., Cary, NC (US)

( * ) Notice: Subject to any disclaimer, the term of this patent is extended or adjusted under 35 U.S.C. 154(b) by 124 days.

(21) Appl. No.: 13/483,504

(22) Filed: May 30, 2012

(65) Prior Publication Data

US 2013/0325437 A1    Dec. 5, 2013

(51) Int. Cl.
*G06F 17/27* (2006.01)
(52) U.S. Cl.
CPC .......... *G06F 17/274* (2013.01); *G06F 17/2785* (2013.01)
(58) Field of Classification Search
CPC ............................. G06F 17/27; G10L 17/26
USPC .................................................. 704/9, 2, 10
See application file for complete search history.

(56) References Cited

U.S. PATENT DOCUMENTS

| 7,764,311 | B2 | 7/2010 | Bill | |
|---|---|---|---|---|
| 2005/0091038 | A1* | 4/2005 | Yi et al. | 704/10 |
| 2008/0249764 | A1* | 10/2008 | Huang et al. | 704/9 |

OTHER PUBLICATIONS

Bollen, J., Mao, H., & Pepe, A. (Jul. 2011). Modeling public mood and emotion: Twitter sentiment and socio-economic phenomena. In ICWSM.*
Kennedy, Alistair, and Diana Inkpen. "Sentiment classification of movie reviews using contextual valence shifters." Computational Intelligence 22.2 (2006): 110-125.*
Watson, David, and Lee Anna Clark. "The PANAS-X: Manual for the positive and negative affect schedule-expanded form." (1999).*
Pang, Bo, and Lillian Lee. "Seeing stars: Exploiting class relationships for sentiment categorization with respect to rating scales." Proceedings of the 43rd Annual Meeting on Association for Computational Linguistics. Association for Computational Linguistics, 2005.*
Snyder, Benjamin, and Regina Barzilay. "Multiple Aspect Ranking Using the Good Grief Algorithm." HLT-NAACL. 2007.*
Bermingham et al., "Classifying Sentiment in Microblogs: Is Brevity an Advantage?", CLARITY: Centre for Sensor Web Technologies School of Computing, Dublin City University, 4 pages, 2010.
Bollen et al., "Modeling Public Mood and Emotion: Twitter Sentiment and Socio-Economic Phenomena", Proceedings of the Fifth International AAAI Conference on Weblogs and Social Media, pp. 450-433, 2011.

(Continued)

*Primary Examiner* — Vincent P Harper
(74) *Attorney, Agent, or Firm* — Kilpatrick, Townsend & Stockton LLP (57) ABSTRACT

Computer-implemented systems and methods are provided for determining an overall mood score of a document. For example, the document is received from a computer-readable medium. A text segment in a document is identified to be indicative of a mood of the document. The text segment is mapped to a mood scale among a predetermined set of mood scales. A mood weight associated with the mood scale for the text segment is generated. An overall mood score of the document is determined based at least in part on the mood weight.

16 Claims, 4 Drawing Sheets

(56) References Cited

OTHER PUBLICATIONS

Bollen et al., "Twitter Mood Predicts the Stock Market", Journal of Computational Science 2, 8 pages, 2011.

"Twitter Predicts the Stock Market" Singularity Hub, http://singularityhub.com/2010/10/21/twitter-predicts-the-stock-market/, 6 pages, Jan. 3, 2012.

* cited by examiner

```
Downcast + Disagreeable + Hurt + Sobbing
              =
DEPRESSED_1 + HOSTILE_2 + DEPRESSED_1 + DEPRESSED_3
              =
Total DEPRESSED Mood Score of 5 and Total HOSTILE Mood Score of 2
```

COMPUTER-IMPLEMENTED SYSTEMS AND METHODS FOR MOOD STATE DETERMINATION

TECHNICAL FIELD

The present disclosure relates generally to the field of data analysis and, more specifically, to computer-implemented systems and methods for mood state determination of documents.

BACKGROUND

Moods or sentiments often are expressed in text documents distributed through the internet or other communication media, such as blog entries, tweets, posts on social networking websites, online conversations, and newspaper articles. Analysis of the moods or sentiments expressed by such text documents has become a valuable tool for various purposes, including marketing, customer relationship management, political analysis, and brand analysis.

SUMMARY

As disclosed herein, computer-implemented systems and methods are provided for determining an overall mood score of a document. For example, the document is received from a computer-readable medium. A text segment in a document is identified to be indicative of a mood of the document. The text segment is mapped to a mood scale among a predetermined set of mood scales. A mood weight associated with the mood scale for the text segment is generated. An overall mood score of the document is determined based at least in part on the mood weight.

As another example, a system for determining an overall mood score of a document includes one or more data processors and a computer-readable storage medium. The computer-readable storage medium is encoded with instructions for commanding the one or more data processors to execute steps including, identifying a text segment in a document that is indicative of a mood of the document, mapping the text segment to a mood scale among a predetermined set of mood scales, generating a mood weight associated with the mood scale for the text segment, and determining an overall mood score of the document based on the mood weight.

As another example, a non-transitory computer-readable storage medium comprises programming instructions for determining an overall mood score of a document. The programming instructions are adapted to cause a processing system to execute steps including, identifying a text segment in a document that is indicative of a mood of the document, mapping the text segment to a mood scale among a predetermined set of mood scales, generating a mood weight associated with the mood scale for the text segment, and determining an overall mood score of the document based on the mood weight.

DETAILED DESCRIPTION

Sentiment analysis of a text document often focuses on determining whether the text document indicates a positive sentiment, a negative sentiment or a neutral sentiment. However, such sentiment analysis lacks depth and analytic variables. A text document may be determined to indicate a negative sentiment, but whether the document indicates a very negative sentiment or a little negative sentiment or whether the negative sentiment results from depression, fear or anger cannot be determined from the sentiment analysis. In addition, sentiment analysis often requires complex linguistic rules which are usually developed in a time-consuming process on a project-specific basis and/or on an industry-specific basis. Even with these complex linguistic rules, high accuracy of the sentiment analysis is often difficult to achieve. Instead, mood state measurements which provide more analytical variables, better depth and reusability over different projects/industries can be used for document analysis.

Figure 1:
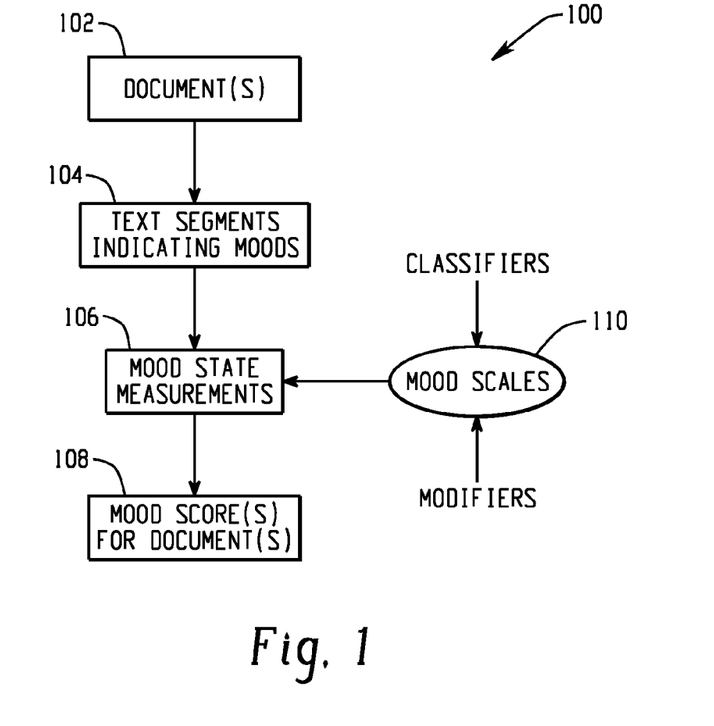
FIG. 1 depicts an example of a configuration of software components for mood state measurements.

FIG. 1 depicts at 100 an example of a configuration of software components for mood state measurements. Text segments 104 indicating moods are identified in one or more documents 102 for mood state measurements 106 to generate an overall mood score 108 for the one or more documents 102. A set of mood scales 110 are implemented for the mood state measurements 106.

Particularly, a text document 102, i.e., a set of written words of any length, can include one or more text segments 104 that each indicate a mood with a varying degree (e.g., a little happy, happy, or very happy). Each of the text segments 104, e.g., a word, a phrase, a sentence, or a paragraph, can be mapped to one of the mood scales 110 and be assigned a mood weight associated with the particular mood scale. An overall mood score can be determined for the document 102 based on the mood scales 110 and the mood weights of the text segments 104.

Figure 2:
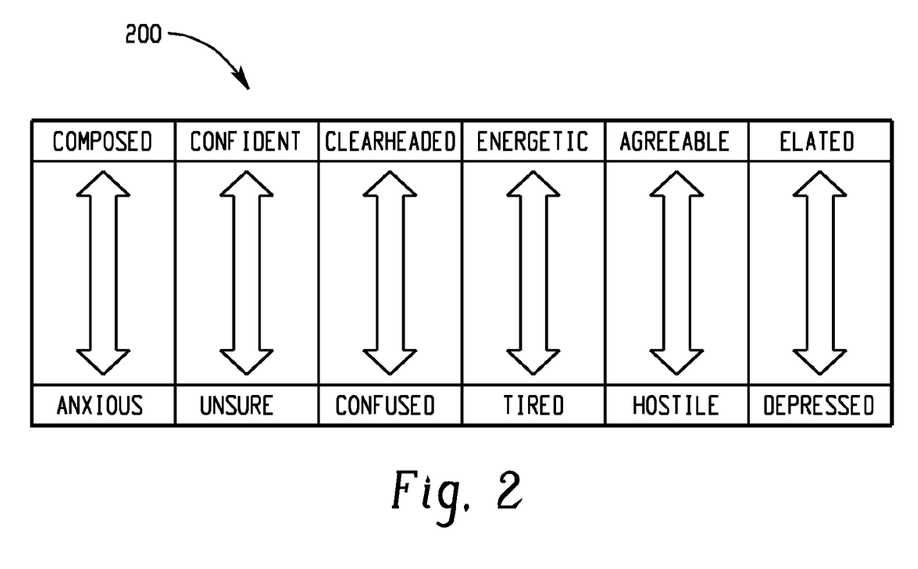
FIG. 2 depicts an example of the mood scales as shown in FIG. 1.

FIG. 2 depicts an example of the mood scales 110. As shown in FIG. 2, the mood scales 110 include six positive moods: "composed," "confident," "clearheaded," "energetic," "agreeable" and "elated," and six negative moods: "anxious," "unsure," "confused," "tired," "hostile" and "depressed." A positive mood and a corresponding negative mood constitute a mood scale.

Referring to FIG. 1 and FIG. 2, if the mood indicated by a text segment 104 matches with a positive mood or a negative mood of a mood scale, such text segment can be mapped to the mood scale. If the text segment indicates the positive mood of the mood scale, a positive weight can be assigned to the text segment. If the text segment indicates the negative mood of the mood scale, a negative weight can be assigned to the text segment. Such a text segment becomes a weighted classifier for the mood. As an example, Table 1 shows some weighted classifiers for different moods.

TABLE 1

| Composed | Weight (+) | Anxious | Weight (-) | Clearheaded | Weight (+) | Confused | Weight (-) |
|---|---|---|---|---|---|---|---|
| alright | 1 | annoyed | 2 | alert | 3 | absent | 3 |
| appease | 2 | agitated | 2 | aware | 2 | absent-minded | 1 |
| appeased | 2 | annoying | 2 | careful | 2 | ambiguous | 2 |
| appeasing | 2 | anxiety | 3 | cautious | 2 | baffle | 1 |
| at ease | 2 | anxious | 3 | clarification | 2 | baffled | 1 |

If a text document includes a plurality of weighted classifiers of a particular mood, the weights of these classifiers may be aggregated to generate a mood score for the mood. If the text document includes classifiers for both the positive mood and the negative mood in a particular mood scale, the negative weights of the classifiers for the negative mood can be subtracted from the positive weights of the classifiers for the positive mood to generate a mood score for the mood scale.

In addition, linguistic modifiers, such as negations, amplifiers and dampers, associated with one or more classifiers in a text document can be included in the mood state measurements of the text document. For example, the classifier "happy" indicates the positive mood "elated" with a mood weight of 2. If a negation "never" is associated with the classifier "happy" (e.g., "never happy"), not only does the mood for the classifier change from "elated" to "depressed" but also the mood weight of the classifier changes from 2 to 1. If an amplifier, such as "very," is associated with the classifier "happy" (e.g., "very happy"), the mood weight of the classifier "happy" is increased from 2 to 3. If a damper, such as "sort of," is associated with the classifier "happy" (e.g., "sort of happy"), the mood weight of the classifier "happy" is decreased from 2 to 1.

Figure 3:
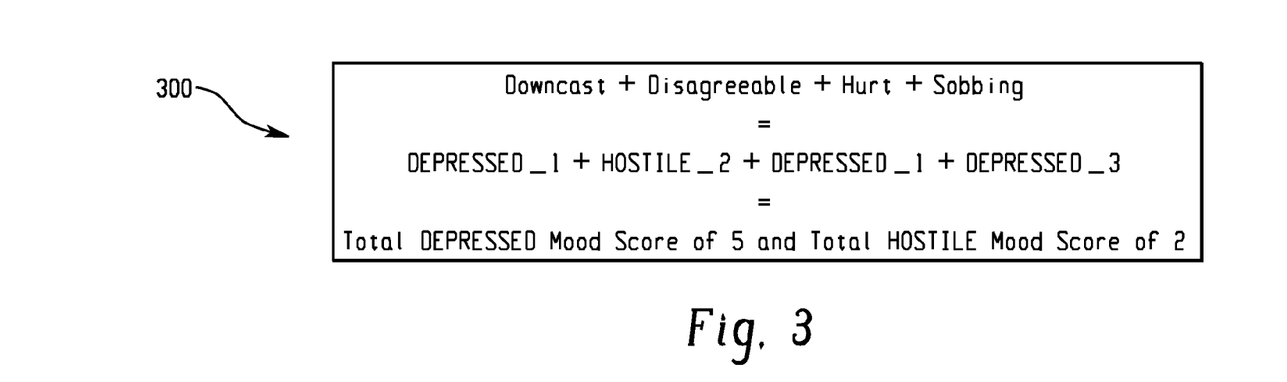
FIG. 3 depicts an example of calculating mood scores for different moods of a text document.

FIG. 3 depicts an example of calculating mood scores for different moods of a text document. As shown in FIG. 3, text segments indicative of a mood are identified in the text document, including "downcast," "disagreeable," "hurt," and "sobbing." These text segments are mapped to the mood scales as shown in FIG. 2, for example. Table 2 shows examples of the moods indicated by the text segments and the corresponding mood weights. "Downcast," "hurt," and "sobbing" are mapped to the mood "depressed," and "disagreeable" is mapped to the mood "hostile." The mood weights of the classifiers are added up to generate mood scores for the moods "depressed" and "disagreeable" respectively.

TABLE 2

|  | Depressed | Weight (-) | Hostile | Weight (-) |
|---|---|---|---|---|
|  | Downcast | 1 | Disagreeable | 2 |
|  | Hurt | 1 |  |  |
|  | Sobbing | 3 |  |  |
| Mood Score(s) |  | 5 |  | 2 |

Figure 4:
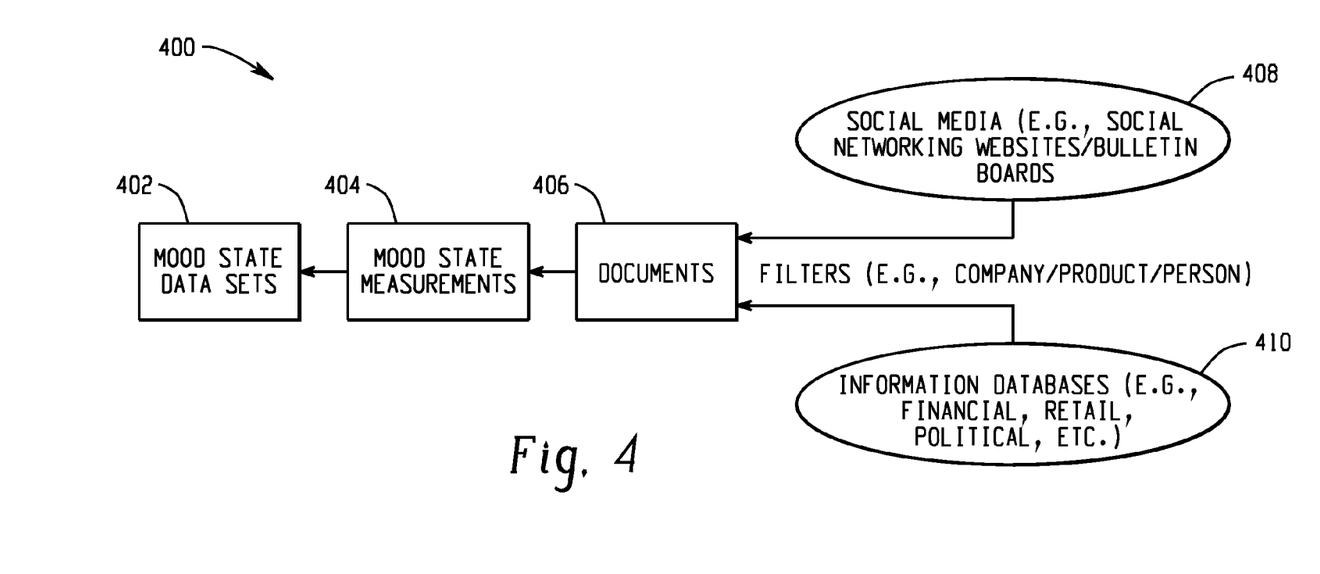
FIG. 4 depicts an example of a configuration of software components for mood state measurements in various contexts.

The mood state measurements can be applied for document analysis in various contexts, such as predictive analysis of information databases and social media analysis. FIG. 4 depicts an example of a configuration of software components for mood state measurements in various contexts. As shown in FIG. 4, documents 406 are extracted from social media 408 or information databases 410 for mood state measurements 404. Mood state datasets 402, such as mood scores for the documents 406, are generated based on the mood state measurements 404.

Specifically, the documents 406 may be extracted from the information databases 410, e.g., financial information databases, retail information databases, and political information databases, or from social media, e.g., social networking websites or bulletin boards. Specific filters may be implemented in order to obtain relevant documents related to a particular company, a particular product, or a particular person.

A reference database may be pre-built for the mood state measurements 404. For example, the reference database may include a plurality of reference text segments indicative of different moods. In another example, the reference database may include three datasets, "start-list," "multiple-term," and "mood-synonym." The dataset "start-list" may contain all possible combinations of categories that a reference text segment indicative of a mood could fall into. These combinations are coded so that the mood types, scores and negation, amplifier and damper classifications for each reference text segment can be extracted. As an example, a reference text segment (e.g., a word) that is linked to a code 2_AMX_zzz_AMP_1_zzz_CONFIDENT_3 would be associated with two classifications: an amplifier and a mood. That is, the reference text segment can be mapped to the mood "confident" with a score of 3, and can be classified as an amplifier with a score of 1. The dataset "multiple-term" may contain a list of multi-term reference phrases indicative of different moods. Various syntaxes can be used in the dataset "multiple-term", such as "attracted to:3:Blank." In addition, the dataset "mood-synonym" may include all the reference text segments and the codes from the dataset "start-list" to which each reference text segment is mapped. For instance, for the reference phrase "a little," the matching code is "1_DXX_zzz_DAMPER_1."

The mood state measurements 404 may be performed for the documents 406 based on the prebuilt reference database. For example, the documents 406 are parsed to extract each text segment (e.g., each word or phrase) into a new dataset "keys." The dataset "keys" may include the numbers of times that each text segment occurs in the documents 406, the number of documents that each text segment occurs in, whether or not the text segment will be kept for mood scoring, a unique ID for each text segment, and an ID of a parent text segment if there is one.

In addition, two datasets, e.g., "offset" and "out," may also be generated. The dataset "offset" may contain the location of each text segment in each document and the dataset "out" may contain information concerning what text segments appear in each document and how many times. For example, the dataset "offset" may be ranked based on text segment appearances per document, and then be reordered as if each of the documents 406 is parsed from left to right. The dataset "keys" and the ranked "offset" dataset are then used to create a new dataset containing all text segments indicative of moods that are found in the documents 406, the synonyms or codes for such text segments, the number of times each text segment occurs per document, and the IDs of the text segments.

Next, each text segment may be classified into one or more of a plurality of categories, e.g., mood, negation, amplifier or damper, according to the code for the text segment. A dataset may be created for each of these categories. For example, the dataset of the mood category may contain a number of text segments of the mood category, the document number in which each text segment appears in, the position of the text segment in the document, and the number of times the text segment appears per document.

The dataset of the mood category may be joined to each of the datasets for negation, amplifier and damper to generate three new datasets in order to find the text segments of the mood category that appear in the documents 406 in close proximity to a text segment of one of the amplifier category, the damper category, and the negation category. The mood scores for the text segments of the mood category may be adjusted accordingly. As an example, if a text segment of the amplifier category is less than 2 positions before a text segment of the mood category in a document, then an amplifier value associated with the text segment of the mood category can be set to 1. If another text segment of the amplifier category is less than 2 positions before the text segment of the mood category in another document, then the amplifier value associated with the text segment of the mood category can be increased (e.g., to 2). In another example, if a text segment of the damper category is less than 2 positions before a text segment of the mood category in a document, then a damper value associated with the text segment of the mood category can be set to −1. If another text segment of the damper category is less than 2 positions before the text segment of the mood category in another document, then the damper value associated with the text segment of the mood category can be increased in magnitude (e.g., to −2). In yet another example, if a text segment of the negation category is less than 3 positions before a text segment of the mood category in a document, then a negation value associated with the text segment of the mood category can be set to 1. If another text segment of the negation category is less than 3 positions before the text segment of the mood category in another document, then the negation value associated with the text segment of the mood category can be increased.

Some text segments in the documents 406 may be classified as indicating more than one mood. For example, the word "content" may be classified as both "composed" and "elated." The code for "content" is 2_MMX_zzz_COMPOSED_2_zzz_ELATED_1. A dataset may be created that contains a number of text segments, one or more moods each text segment can be classified as, and the mood scores corresponding to the one or more moods the text segment can be classified as. Table 3 shows an example of such a dataset.

TABLE 3

| TERM | MOOD | MOOD SCORE |
|---|---|---|
| content | composed | 2 |
| content | elated | 1 |
| capable | confident | 2 |
| wilder | energetic | 3 |

The dataset can be joined to the datasets of the amplifier category, the damper category, and the negation category in order to create a new dataset. An adjusted mood score for each text segment can be calculated and included in the new dataset. For example, if the negation value of the text segment is not 1 or larger, and if a sum of the mood score, the amplifier value, and the damper value for each text segment is larger than 0.5, then such sum is assigned to the text segment as the adjusted mood score. If the negation value of the text segment is not 1 or larger, and if a sum of the mood score, the amplifier value and the damper value for each text segment is no larger than 0.5, the adjusted mood score for the text segment is set to 0.5. If the negation value of the text segment is 1 or larger, then the mood associated with the text segment is adjusted to an opposite mood and the adjusted mood score for the text segment is set to 1. Table 4 shows an example of the new dataset.

TABLE 4

| Text Segment | Mood | Mood Score | Amplifier | Damper | Negation | Adjusted Mood | Adjusted Mood |
|---|---|---|---|---|---|---|---|
| content | composed | 2 | 2 | −1 | . | 3 | composed |
| capable | confident | 3 | . | . | 1 | 1 | unsure |

Once the adjusted mood scores have been determined for each text segment, overall mood scores may be generated for each of the documents 406 by summing the adjusted mood scores of the text segments indicative of moods in the document. A resulting dataset includes an ID for each document and overall mood scores of different moods (e.g., one or more of the twelve moods as shown in FIG. 2) for each document. Table 5 shows an example of such a dataset.

TABLE 5

| DOC ID | CONFUSED | ELATED | TIRED | UNSURE | HOSTILE | CONFIDENT | AGREEABLE |
|---|---|---|---|---|---|---|---|
| 30 | 2 | . | 1 | . | . | 6 | . |

A final dataset may be generated to include overall mood scores of different mood scales (e.g., one or more of the six mood scales as shown in FIG. 2) for each document by subtracting the overall mood score of a negative mood from the overall mood score of the corresponding positive mood in a same mood scale. The final dataset may be joined back with the documents 406 to obtain information such as original texts and dates of the documents 406. For example, the mood state datasets 402 may include the final dataset joined with the documents 406, the final dataset, and/or any other datasets discussed above.

The mood state measurements 404 can be implemented in various contexts. For example, a company engaging in a marketing campaign for a particular product can set up a clearing house including a mood measurements system which automatically extracts documents related to the product from certain social media websites and generates mood state datasets for the extracted documents. The generated mood state datasets, together with consumer information, can provide detailed information indicating how different groups of consumers feel about the product so that marketing efforts can be more focused to improve efficiency. As another example, mood state measurements may be used for data mining in various business applications, such as customer relationship management. In addition, the mood state measurements can be applied to data in various analytic capacities, such as data enrichment for econometric models, augmentation of exogenous variable space for greater prediction accuracy, identification of leading and lagging indicators, prediction of one-time events (e.g., new product launches, movie premiers, breaking news), and analytic survey data enrichment (e.g., employee satisfaction, net promoter).

Figure 5:
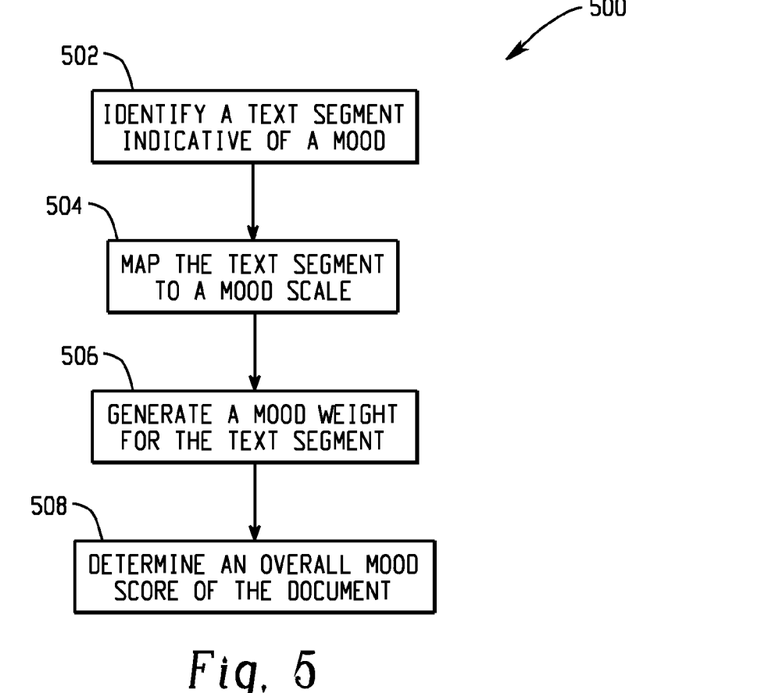
FIG. 5 depicts an example flow diagram for determining an overall mood score of a document.

FIG. 5 depicts an example flow diagram for determining an overall mood score of a document. At 502, a text segment indicating a mood is identified in the document. At 504, the identified text segment is mapped to a mood scale, and at 506 a mood weight is generated for the text segment. The mood scale may be one of a predetermined set of mood scales. At 508, an overall mood score is determined for the document based at least in part on the mood weight of the text segment.

Figure 6:
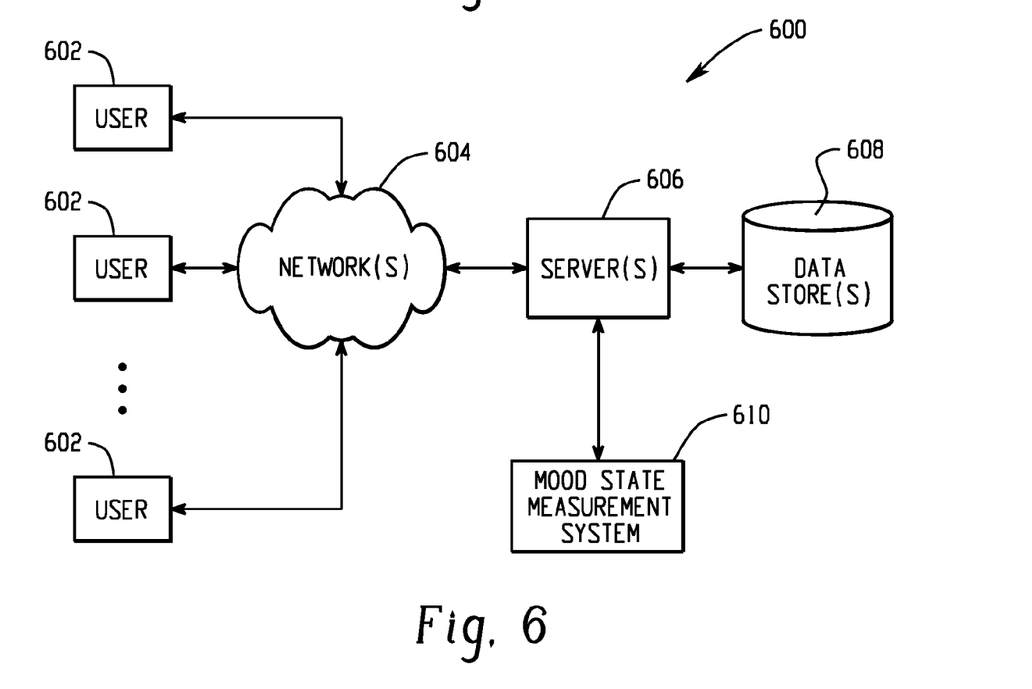
FIG. 6 depicts a computer-implemented environment wherein users can interact with a mood state measurement system hosted on one or more servers through one or more networks.

FIG. 6 depicts a computer-implemented environment wherein users 602 can interact with a mood state measurement system 610 hosted on one or more servers 606 through one or more networks 604. One or more servers 606 accessible through the network(s) 604 can host the mood state measurement system 610. The one or more servers 606 can also contain or have access to one or more data stores 608 for storing data for the mood state measurement system 610.

Figure 7:
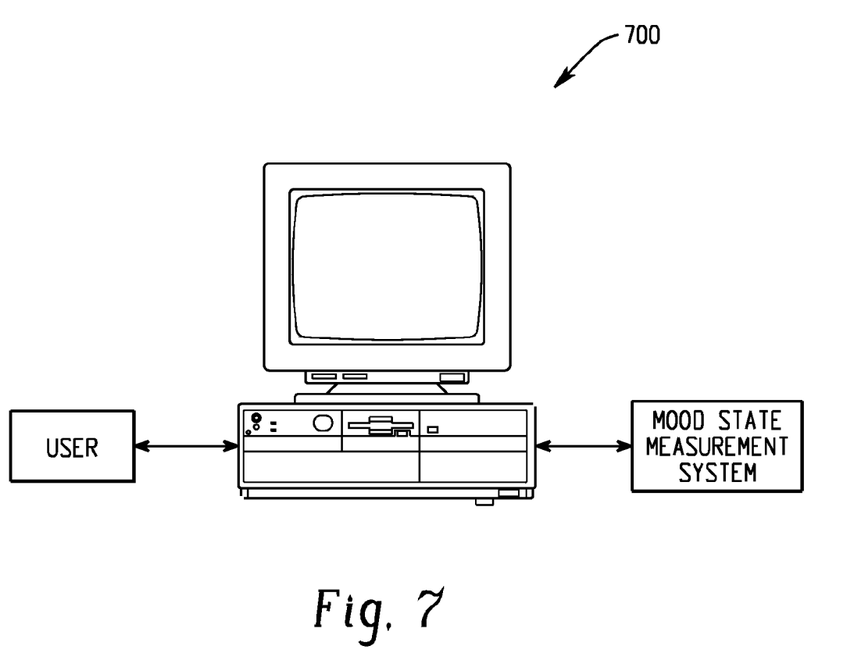
FIG. 7 depicts a mood state measurement system provided on a stand-alone computer for access by a user.

This written description uses examples to disclose the invention, including the best mode, and also to enable a person skilled in the art to make and use the invention. The patentable scope of the invention may include other examples. For example, a computer-implemented system and method can be configured such that a mood state measurement system can be provided on a stand-alone computer for access by a user, such as shown at 700 in FIG. 7.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions (e.g., software) for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

The invention claimed is:

1. A computer-program product tangibly embodied in a non-transitory, computer-readable storage medium that stores instructions, the instructions executable by a data processing apparatus for performing operations including:
   accessing a mood evaluation index that maps text to mood categories, wherein text describes a state associated with at least one of the mood categories, and wherein a mood category is associated with a state;
   mapping text to a mood category using the mood evaluation index, wherein the mood evaluation index associates a state with the text;
   calculating a mood weight for the text, wherein mood weights are calculated using a mood evaluation index, and wherein mood weights represent an intensity of the state that the text describes;
   accessing a message, wherein the message includes text mapped by the mood evaluation index;
   using the mood evaluation index to identify text included in the message that is mapped to a mood category;
   determining whether a modifier is in proximity to identified text;
   adjusting the mood weight of the identified text that is in proximity to the modifier;
   summing the mood weights of the identified text, wherein summing includes determining a category score corresponding to the mood category; and
   outputting the category score corresponding to the mood category.

2. The computer-program product of claim 1, wherein the modifier is an amplifier, a damper or a negation.

3. The computer-program product of claim 1, wherein the modifier is an amplifier, and wherein adjusting the mood weight of the identified text that is in proximity to the modifier includes increasing the mood weight.

4. The computer-program product of claim 1, wherein the modifier is a damper or a negation, and wherein adjusting the mood weight of the identified text that is in proximity to the modifier includes decreasing the mood weight.

5. The computer-program product of claim 1, wherein the mood weight is alphanumeric.

6. The computer-program product of claim 1, wherein summing the mood weights accounts for repeated use, within the message, of the same text mapped to the mood category.

7. The computer-program product of claim 1, wherein multiple words are mapped to a same mood category within the mood evaluation index.

8. The computer-program product of claim 1, wherein the identified text is mapped to more than one mood category.

9. A system comprising:
a processor configured to perform operations that include:
accessing a mood evaluation index that maps text to mood categories, wherein text describes a state associated with at least one of the mood categories, and wherein a mood category is associated with a state;
mapping text to a mood category using the mood evaluation index, wherein the mood evaluation index associates a state with the text;
calculating a mood weight for the text, wherein mood weights are calculated using a mood evaluation index, and wherein mood weights represent an intensity of the state that the text describes;
accessing a message, wherein the message includes text mapped by the mood evaluation index;
using the mood evaluation index to identify text included in the message that is mapped to a mood category;
determining whether a modifier is in proximity to identified text;
adjusting the mood weight of the identified text that is in proximity to the modifier;
summing the mood weights of the identified text, wherein summing includes determining a category score corresponding to the mood category; and
outputting the category score corresponding to the mood category.

10. The system of claim 9, wherein the modifier is an amplifier, a damper or a negation.

11. The system of claim 9, wherein the modifier is an amplifier, and wherein adjusting the mood weight of the identified text that is in proximity to the modifier includes increasing the mood weight.

12. The system of claim 9, wherein the modifier is a damper or a negation, and wherein adjusting the mood weight of the identified text that is in proximity to the modifier includes decreasing the mood weight.

13. The system of claim 9, wherein the mood weight is alphanumeric.

14. The system of claim 9, wherein summing the mood weights accounts for repeated use, within the message, of the same text mapped to the mood category.

15. The system of claim 9, wherein multiple words are mapped to a same mood category within the mood evaluation index.

16. The system of claim 9, wherein the identified text is mapped to more than one mood category.

* * * * *